United States Patent [19] … [11] 4,453,614
Allen et al. … [45] Jun. 12, 1984

[54] STEERING ARRANGEMENT FOR AN OFF-HIGHWAY ARTICULATED VEHICLE

[75] Inventors: James R. Allen, Bettendorf, Iowa; Christopher A. Myers, Champaign, Ill.

[73] Assignee: Deere & Company, Moline, Ill.

[21] Appl. No.: 360,022

[22] Filed: Mar. 19, 1982

[51] Int. Cl.³ .............................................. B62D 5/10
[52] U.S. Cl. ................................................... 180/139
[58] Field of Search ............... 180/139, 235, 236, 237, 180/238, 14 R

[56] References Cited

U.S. PATENT DOCUMENTS 2,583,197 1/1952 Armington ........................ 180/139
3,368,292 2/1968 Prinoth ........................... 180/139 X
3,912,300 10/1975 Bryan .............................. 180/139 X Primary Examiner—John A. Pekar

[57] ABSTRACT

In an articulated combine, front and rear bogies are connected by spaced-apart upper and lower links. The upper link permits relative lateral movement between the bogies due to oscillation about a longitudinal axis. At the lower link, a rigid tongue of the rear bogie is connected to the front bogie by a ball hitch. Steering of the vehicle is through a pair of hydraulic cylinders controlled in part by a feedback cylinder. The steering cylinders are connected together to the rear bogie, at a common ball joint. All other connections of the hydraulic cylinders are ball and socket type and their effective pivot centers define respective transverse (kneel) and longitudinal (oscillation) axes, intersecting at the ball hitch. Forward connections of the steering cylinders and one end of the feedback cylinder lie on the kneel axis. The common rearward steering cylinder connection and the connection of the other end of the feedback cylinder lie on the oscillation axis. This arrangement isolates the steering system from oscillation and tipping movement of one bogie relative to the other in the sense that such movement, by itself, does not directly impose length changes or axial loading in the steering system cylinders.

11 Claims, 6 Drawing Figures

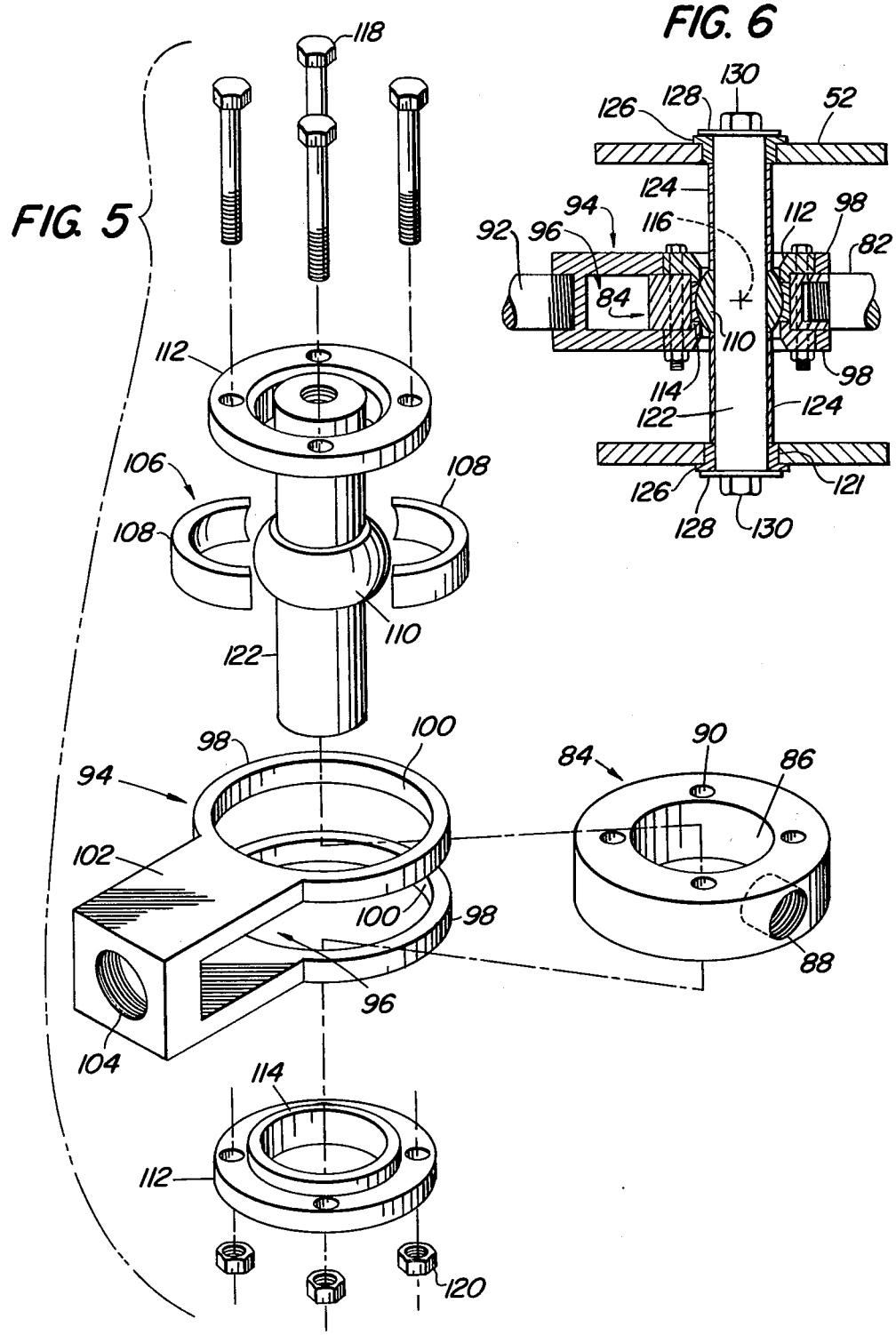

STEERING ARRANGEMENT FOR AN OFF-HIGHWAY ARTICULATED VEHICLE

BACKGROUND OF THE INVENTION

This invention is concerned with articulated vehicles and, more particularly, with means for coupling the front and rear bogies of such vehicles and for steering them. The invention is particularly adaptable to self-propelled agricultural machines such as combine harvesters.

Hinge-steer articulated vehicles are, potentially, more stable on side slopes than rigid chassis vehicles of similar dimensions. The necessary oscillation (about a longitudinal axis) between front and rear portions or bogies of the vehicle is provided for in the connection between them. However, when steering is by mechanical linkage connected between the bogies, it is desirable to "isolate" the linkage so that oscillation does not influence the steering. A common method for achieving this isolation is illustrated in U.S. Pat. Nos. 4,181,315 van der Lely and 4,317,326 Riedinger (also assigned to the assignee of the present invention). Both disclose similar mechanisms the first in a tractor, the second in a combine harvester. In the tractor, a swivel in tandem with the steering linkage permits oscillation without affecting (twisting) the steering linkage. Disadvantages of this system include having to accommodate the lengthy tandem combination of steering linkage and swivel and the relatively high cost (including machining cost) and weight of the parts involved. The combine arrangement is more compact but the other disadvantages remain.

SUMMARY OF THE INVENTION

Accordingly, an object of the present invention is to provide, in an articulated vehicle, a simple, compact arrangement for coupling the front and rear bogies of the vehicle while at the same time providing a steering system unaffected by oscillation between them.

The invention involves pivotal connection of one body to another and the arrangement or combination of such connections to achieve particular results. The term "universal pivoting" as used below may be taken to mean relative motion between first and second bodies about a pivot center defined by the elements connecting them and include, for an axis of the body passing through the pivot center, swinging of that axis in any plane and rotation of the body about that axis. "Limited universal pivoting" is provided, for example, by a conventional ball and socket joint.

According to the invention, the principal or hitch connection between front and rear bogies permits at least oscillation and steering, and preferably at least limited universal pivoting, about a single point or center such as may be defined by the center of the ball of a ball and socket type connection. A steering link, including a linear actuator such as a hydraulic cylinder, is connected between the frame of the front bogie, at a point offset to one side of the hitch pivot center, and a point on the rear bogie frame in approximately the same fore-and-aft vertical plane as the hitch pivot center. Preferably both end connections of the steering actuator to the bogie frames permit at least limited universal pivoting through the use of suitable connecting elements cooperating to function in the manner of a ball and socket joint.

In a preferred embodiment, a pair of hydraulic cylinders are used, arranged on opposite sides of a fore-and-aft centerline of the vehicle. Compared with a single steering actuator link, coacting twin actuator links induce smaller loads on structural elements such as the hitch pivot connection. According to the invention, the twin actuator links share a common connecting or pivot center on the rear bogie frame; that is to say their lines of action intersect at a common fixed point on the rear bogie frame. A line joining this fixed point to the hitch pivot center, defines a roll or oscillation axis for the rear bogie (as long as the actuators are hydraulically locked or inextensible, as they may be considered to be in normal operation).

In articulated vehicles using two-wheeled bogies (with the wheels of each bogie laterally spaced) the hitch connection between front and rear bogies must provide a stabilizing force so that they do not "kneel" or pitch towards or away one from another. This may be done with a rigid vertical gudgeon arrangement (see for example, U.S. Pat. No. 4,290,622, Horvath) but in relatively tall, bulky vehicles such as combine harvesters, it is more cost-effective to use, in combination, a lower, single pivot, hitch arrangement such as the ball type suggested above and, spaced substantially above it, a tie link between front and rear bogies such as disclosed in Riedinger for example. A characteristic of this configuration is the kneeling (pitching together of front and rear bogies) associated with oscillation. This is due to relative lateral displacement between the upper portions of the two bogies and consequent foreshortening of the upper link. To maintain the isolation of the steering system, and in keeping with the invention, the steering cylinder connection pivot centers on the front bogie may be aligned laterally with the hitch pivot center, and spaced on opposite sides of that hitch center, so as to define a kneel axis (as long as the steering actuators are hydraulically locked or otherwise inextensible). Thus the rear bogie can oscillate, with associated kneeling about the kneel axis without distorting the steering linkage geometry and hence imposing steering instability. All of the pivot points of the steering linkage (including the hitch pivot center) remain in their common plane and their spatial relationship is not disturbed.

It is clear that in the system just described, the effective roll or oscillation axis of the rear bogie passes through the effective pivot centers of the hitch connection and the common steering actuator connection on the rear bogie. Oscillation about any other axis passing through the hitch pivot center would require swinging of the oscillation axis just defined and would normally be inhibited by hydraulically locked steering cylinders or other inextensible actuators. However, unless the oscillation axis is in a plane passing through the contact area of the rear bogie wheels with the ground, oscillation about that axis must be accompanied by relative lateral displacement between the wheels of the front and rear bogies. In practice, this means the imposition of internal stresses in the vehicle and side loading on the wheels as the vehicle traverses uneven ground. To minimize this effect, the single plane containing the steering linkage pivot centers and the hitch pivot center should, if horizontal, be as close to the ground as possible and/or should slope downwardly and rearwardly.

In steering systems using hydraulic cylinders, a feedback or follow-up cylinder is conventionally and typically provided. The results of the invention may be maintained by connecting the feedback cylinder in the same way that the steering cylinders themselves are connected—that is with one connection pivot center on the kneel axis of the vehicle and the other on the oscillation axis. The latter point may be on the same side of the hitch point as the steering cylinders or on the opposite side.

The invention has been described, at least in part, in a particular directional orientation, referring to front and rear units. It will be clear that the invention may also be applied to a vehicle in which the hitch and steering arrangement is reversed. (Or it may be said that, in a given vehicle, the invention is operative whether the vehicle is driven forward or in reverse.)

BRIEF DESCRIPTION OF THE DRAWINGS

FIG. 5 is an enlarged exploded perspective view of principal components at the rear common connecting point of the two steering cylinders.

FIG. 6 is an enlarged partial sectional view of the steering cylinder connection to the rear bogie, taken approximately on line 6—6 of FIG. 4.

DESCRIPTION OF THE PREFERRED EMBODIMENT

Figure 1:
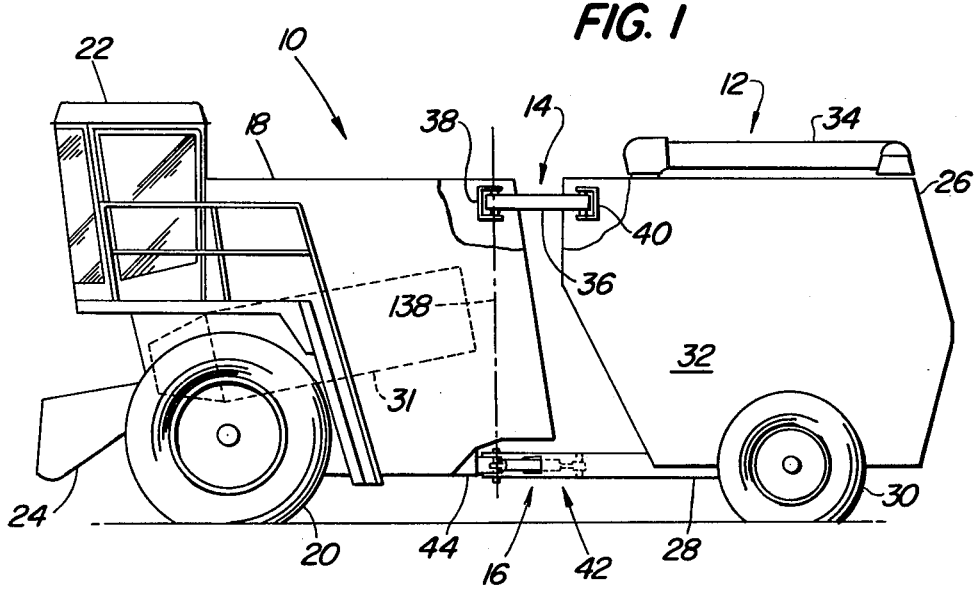
FIG. 1 is a semi-schematic left side elevation of an articulated combine embodying the invention.

The invention is embodied in an articulated self-propelled combine shown semi-schematically in side view in FIG. 1. An articulated vehicle of this general type is disclosed in such detail in the above mentioned U.S. Pat. No. 4,317,326 Riedinger that only a brief summary of the common disclosure need be given here.

The vehicle comprises front and rear bogies 10 and 12, coupled together by an upper link assembly 14 and a lower link or hitch arrangement 16. The front bogie includes a body 18 supported above the ground by laterally spaced drive wheels 20. An operator station 22 is mounted high and forward on the body which also supports a forward mounted conventional harvesting header 24 (only the feederhouse portion of which is shown in the drawings). The rear bogie includes a body portion 26 having a chassis or main frame 28 and is supported above the ground on a pair of laterally spaced wheels 30.

The functions of the combine are conventional. Crop material removed from a field by the header 24 is processed at least partially in the front bogie 10 by means including an axial flow rotary separator 31; material is transferred to the rear bogie (by means not shown) and eventually, clean grain is delivered to a grain tank 32, occupying most of the rear bogie 12, and may be off-loaded from the combine by means of an unloading auger system 34.

The upper link 14 may be of any type which permits relative lateral movement between the portions of the front and rear bogies to which it is connected. Some appropriate linkage systems are described in Riedinger. In the present embodiment, a simple link 36 is used, pivotally connected at its opposite ends to frame members 38 and 40 of the front and rear bogies respectively.

Figure 2:
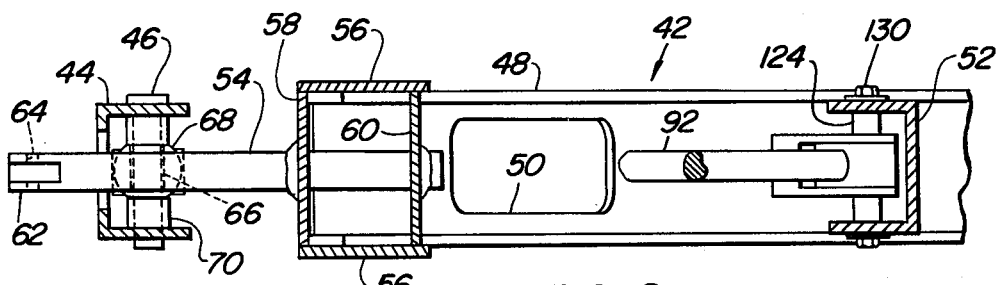
FIG. 2 is an enlarged partial side view of the lower hitch connection between the front and rear bogies of the combine, partially sectioned on a central longitudinal plane.
Figure 4:
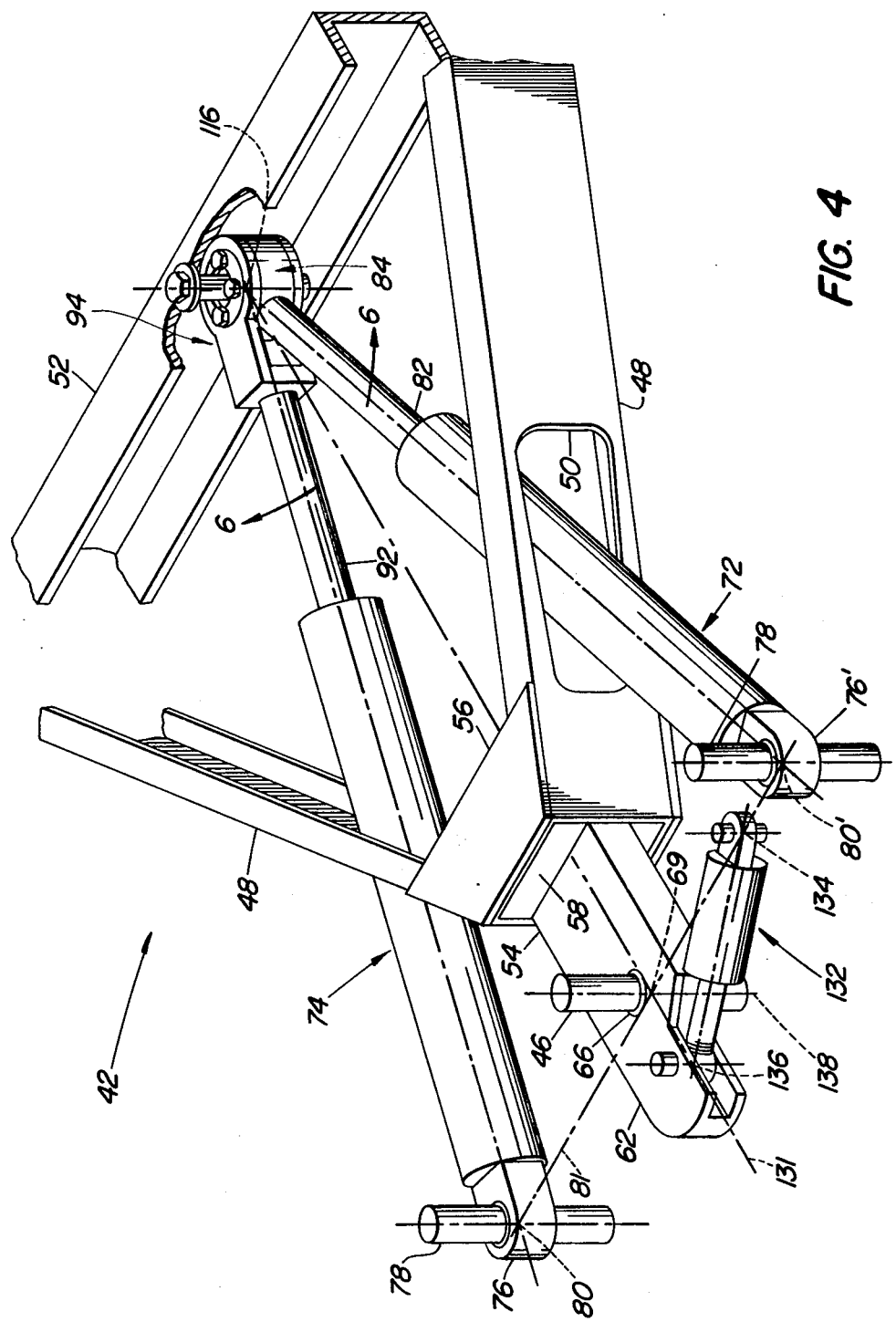
FIG. 4 is an enlarged front left three-quarter perspective partial view showing the hitch connection and steering linkage at the lower hitch connection.

Turning now to the connecting elements of the lower link or hitch assembly 16, seen best in FIGS. 2 and 4—a forward extending tongue assembly 42 is coupled to a lower frame member 44 of the front bogie by a hitch pin 46. The tongue assembly 42 includes an A-frame structure having opposite forwardly converging side members 48, each with an approximately rectangular clearance hole 50 towards its forward end and secured at its rearward end to the chassis 28 of the rear bogie 12. An intermediate cross member 52 extends between the two side members 48.

At the forward convergence of the tongue side members 48, a tongue member 54 is secured in welded assembly by upper and lower gussets 56 and front and rear bulkheads 58 and 60 respectively. The forward extremity 62 of the tongue member 54 is modified into a clevis configuration and includes a through hole 64 for connecting a feedback cylinder. Rearward of the hole 64, in fore-and-aft alignment, is a hitch pin hole 66 defined by a hitch ball 68, retained in the tongue portion 54 by conventional means. The ball center 69 establishes the hitch pivot center. As indicated in FIG. 2, the hitch connection is completed by positioning spacers 70 above and below the hitch ball 68 and inserting the hitch pin 46 through holes in the front bogie frame member 44, the spacers 70 and the hitch pin holes 66.

Steering actuators for the combine are left- and right-hand hydraulic cylinders 72 and 74 respectively, generally conventional except for their rod ends. The cylinder head ends 76, 76' respectively, the connecting elements of which include conventional captive balls, are coupled to the front bogie frame member 44 using pins 78 (seen best in FIG. 4) and spacers (not shown) in an arrangement similar to that of the main hitch pin 46 so that the respective pivot centers 69, 80, 80' of the hitch ball and the steering cylinder head ends are aligned and spaced apart equally as shown in FIG. 4. This line of centers defines a transverse pivot or kneel axis 81.

Looking now at the connecting elements and treatment of the steering cylinder rod ends and referring particularly to FIGS. 5 and 6, the rod 82 of the left cylinder 72 has threaded onto it a ring 84 which includes a cylindrical bore 86 having an axis perpendicular to the steering cylinder rod axis, a threaded hole 88 for receiving the cylinder rod 82 and four equally spaced holes 90 paralleling the bore 86. The rod 92 of the right-hand steering cylinder 74 has, threaded onto it, a clevis-like fitting 94, including a clevis space 96 defined in part by a pair of coaxial spaced-apart rings 98, each having coaxial cylindrical bores 100 extending from a body portion 102 which includes a threaded hole 104 for receiving the rod 92.

The connecting of the steering cylinders 72, 74 to the rear bogie, may be completed as follows: the cylinder rod ends are brought together with the ring 84 inserted into the clevis space 96 and positioned so that the cylindrical bores 86 and 100 are concentric. Then a ball and socket assembly 106 comprising a pair of socket halves 108 and a ball member 110 are inserted in the bore 86. Retaining rings 112 assembled top and bottom fit snugly within the respective bores 100 of the rings 98 and include bushing portions 114 which enter the bore 86 of the ring 84 to position the socket halves 108, and hence the ball 110, accurately so that the ball's effective pivot center is aligned with the axes of the steering cylinders 72 and 74 at their point of intersection 116. This union of the cylinder rod ends is secured by cap screws and nuts, 118 and 120 respectively. The connection of the steering cylinder rod ends to the rear bogie 12 is completed as shown in FIG. 6 at a central through hole 121 in the A-frame cross member 52 by means of pin 122, spacers 124, bushings 126 and washers and cap screws 128, 130 respectively.

With the connections so made, the line of the centers of the hitch pivot and common steering cylinder pivot, 69 and 116 respectively, define an oscillation axis 131 for the rear bogie 12 relative to the front bogie 10. The complementary treatments of the rod ends of the respective steering cylinders 72, 74 permit them to embrace the same pivot ball (110) and pivot together universally in relation to that ball. At the same time the cylinders can pivot relative to each other about pivot center 116 in the plane defined mutually by their longitudinal centerlines or lines of action (80-116, 80'-116) by means of the rotational bearings established by ring 84, yoke 94 and retainers 12 as described above.

The steering system feedback cylinder 132 (FIG. 4) is generally conventional and includes ball-jointed ends for pivotally connecting it between the feedback cylinder holes 64 of the tongue 54 and the front bogie frame member 44 as indicated in FIG. 4 in such a way that the pivot centers 134, 136 of the feedback cylinder balls are in alignment with the transverse kneel axis 81 and with the oscillation axis 131 respectively.

The vehicle hydraulic system (not shown) is generally conventional and includes a pump and distribution system for, selectively, delivering oil under pressure to the steering cylinders 72, 74. Actuation of the steering system swings or slews the rear bogie 12 relative to the front bogie 10, pivoting about hitch pivot center 69. Preferably, the forward end of the upper link 36 is in vertical alignment with the hitch pivot center 69 so that the basic steering motion is about an upright axis 138 passing through the upper link 36.

Figure 3:
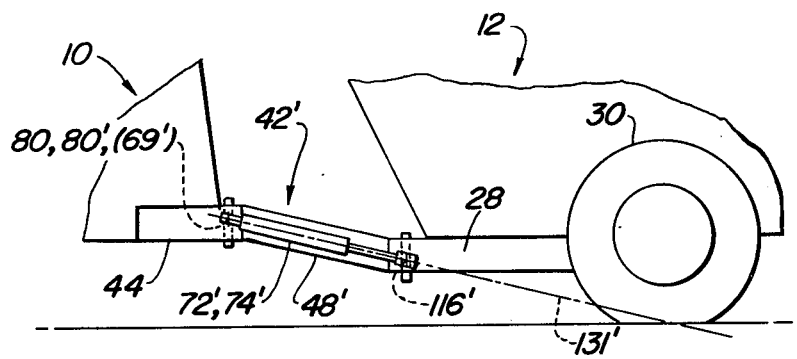
FIG. 3 is a schematic somewhat enlarged partial side view indicating an arrangement of components of the lower hitch connection for an alternative embodiment of the invention.

In an alternative embodiment shown in FIG. 3, the tongue assembly 42' is canted upwards so that the plane containing the steering linkage pivot centers (corresponding to 80, 80', 69 and 116) is inclined and so that the oscillation axis 131' lies in a plane which intersects the ground close to the contact points of the wheels 30 of the rear bogie 12.

As described above, at the lower link or coupling of the two bogies of the articulated combine, the hitch and all steering actuator connections are, at least to a limited degree, universal pivots. Their effective pivot centers all lie in a common plane and on a pair of intersecting axes (oscillation 131, kneel 81) intersecting at the hitch pivot center 69. Clearly, oscillation of the rear bogie 12 is constrained to be about oscillation axis 131 as long as the steering cylinders 72, 74 are either hydraulically locked or under control of their hydraulic control system. Oscillation effectively foreshortens the upper link 36 causing kneeling between the front and rear bogies 10, 12. Clearly, this can take place only about kneel axis 81. As long as all steering linkage connecting points lie on one or other of these two axes, there will be no tendency for the steering cylinders to change length or have axial loads imposed in them during oscillation or kneeling, at least not from these motions themselves.

For a simple hitch (without steering cylinder restraint) the natural axis of oscillation would be similar to that passing through the ground contact point of the rear wheels as shown at 131' in FIG. 3. However, when the plane containing the hitch and the steering linkage connecting points is significantly above the ground, it can be seen that oscillation caused by uneven ground would tend to swing the hitch of the rear bogie relative to the front bogie. Under the restraining influence of the steering cylinders, oscillation is transferred to being about axis 131 (approximately parallel to the ground in the embodiment of FIG. 1). When oscillation occurs during actuation of the steering system, the steering cylinders remain under the control of the hydraulic system and oscillation and kneeling causes no internal changes in the steering or hitch geometry so that steering stability is maintained while the vehicle advances over uneven ground.

In the alternative embodiment of FIG. 3, the disposition of the steering linkage and hitch connecting points all in their common plane has been chosen so that the oscillation axis (131') coincides with a "natural" axis of oscillation so that operation and performance although essentially similar to that of the embodiment of FIG. 1, results in less internal loading of the combine frame structure.

An additional advantage of a hitch and steering linkage system according to the invention, is that the components are simple, relatively light in weight and easily manufactured. The use of ball and socket joints throughout makes it feasible to control clearances at all pivot points so that play and lost motion is reduced to a minimum, enhancing the stability and smoothness of the steering maneuvers themselves and hence contributing to better stability of the complete vehicle.

We claim:

1. An off-highway articulated vehicle for traversing an uneven ground surface comprising:
   front and rear bogies, each having at least one pair of laterally spaced wheels for supporting the bogie above the ground surface;
   means, including a hitch pivot, for pivotally connecting the rear bogie to the front bogie so that relative movement may take place between the bogies, including pivoting about an upright axis passing through the hitch pivot for steering the vehicle and oscillation about a generally fore-and-aft oscillation axis for conforming the vehicle to the uneven surface; and
   power means for effecting the pivoting about the upright axis, including first and second hydraulic cylinders each having a first end pivotally connected to the front bogie, at opposite sides of the hitch pivot respectively, and a second end pivotally connected to the rear bogie so that the respective longitudinal axes of the hydraulic cylinders intersect at and share a common pivot center positionally fixed with respect to the rear bogie, the connections of the hydraulic cylinders to the rear bogie including universal pivot means for defining the common pivot center and effective to permit oscillation of the rear bogie relative to the front bogie without disturbing the spatial relationship of the first cylinder to the second cylinder so that said oscillation does not distort the steering effect of the cylinders.

2. The articulated vehicle of claim 1 wherein the means for pivotally connecting the rear bogie to the front bogie comprises a lower portion including the hitch pivot, said pivot providing a universal pivot connection defining a hitch pivot center, and an upper portion spaced upward from the lower portion, said upper portion permitting relative lateral displacement between at least the upper portions of the respective bogies and wherein the connections of the hydraulic cylinders to the front bogie include universal pivot means, each of said means defining a pivot center and said centers being in common transverse alignment with the hitch pivot center and defining a kneel axis so that relative pivoting of the bogies may take place about the kneel axis with no influence on steering cylinder length.

3. The articulated vehicle of claim 2 wherein the upper portion of the means for connecting the bogies includes a normally fore-and-aft link extending between and pivotally connected at its opposite ends to the front and rear bogies respectively.

4. The articulated vehicle of claim 2 and further including a feedback hydraulic cylinder and universal pivot means for connecting the opposite ends of said cylinder respectively to the front and rear bogies, said connections defining pivot centers and said centers being spaced from the hitch pivot center and lying on the oscillation and kneel axes respectively.

5. The articulated vehicle of claim 1 wherein the connection of the hydraulic steering cylinders to the rear bogie is below that of their connection to the front bogie so that the plane defined by the longitudinal axes of the hydraulic cylinders is inclined rearwardly and downwardly.

6. The articulated vehicle of claim 5 wherein the plane defined by the axes of the hydraulic steering cylinders intersects the wheels of the rear bogie adjacent their contact point with the ground surface.

7. The articulated vehicle of claim 1 wherein the universal pivot means includes:
 a pivot member carried in fixed positional relationship to the rear bogie, said member having external surfaces including a spherical surface portion having a center defining the common pivot center;
 a first annular member carried by the second end of the first hydraulic cylinder having a bore perpendicular to the cylinder longitudinal axis;
 a second annular member carried by the second end of the second hydraulic cylinder having a bore perpendicular to the cylinder longitudinal axis; and
 adapter means for retaining the bores of the annular members in coaxial alignment and in a universal pivoting relationship with the common pivot center.

8. An off-highway articulated vehicle comprising:
 a forward mobile unit supported above the ground on laterally spaced wheels and having a rearward hitch element;
 a rear mobile unit supported above the ground on laterally spaced wheels and having a forward hitch element;
 means for connecting together the respective hitch elements of the front and rear mobile units, said means defining a hitch pivot center and permitting at least limited relative motion between said mobile units, pivoting about said center including pivoting about an upright axis and oscillation between the units;
 first and second rear steering cylinder connecting elements carried by the rear mobile unit and at least partially defining a common universal steering cylinder pivot center disposed so that a line passing through said steering cylinder pivot center and said hitch pivot center lies in a generally fore-and-aft vertical plane of the rear mobile unit and defines an oscillation axis for said unit, the second rear steering cylinder connecting element being operatively associated with the first rear steering cylinder connecting element and disposed so as to be universally pivotable about said rear steering cylinder universal pivot center and so define the common pivot center;
 first and second steering cylinder forward connecting elements carried by the forward mobile unit, each at least partially defining a pivot axis laterally spaced from and, respectively, on opposite sides of the hitch pivot center; and
 first and second steering cylinders connected between the respective forward and rear steering cylinder connecting elements, the longitudinal axes of the two cylinders intersecting at the common pivot center of the rear mobile unit, and said cylinders being operable to extend and retract so as to slew the rear unit with respect to the front unit, said pivot connections of the steering cylinders to the rear mobile unit unit and of the hitch permitting relative oscillation between the mobile units about the oscillation axis, without modifying the steering effect of the steering cylinder.

9. A steering arrangement for an off-highway articulated vehicle having first and second bogies coupled together so as to permit at least limited universal pivoting between the bogies about a hitch pivot center, and a pair of hydraulic cyliders each having a longitudinal axis and a first end connected to the first bogie and a second end connected to the second bogie said connections defining cylinder pivot centers characterized in that the cylinder longitudinal axes and the hitch pivot center all lie in the same plane and that the pivot centers of the cylinder first ends are disposed one on each side of the hitch pivot center and in lateral alignment with it and that the cylinder longitudinal axes intersect at a point of intersection and the respective pivot centers of the cylinder second ends coincide with said point of intersection.

10. An articulated combine comprising:
 a forward bogie including crop gathering and processing means;
 a rear bogie incuding crop handling means;
 a hitch connecting the front and rear bogies towards their lower portions and defining a hitch pivot center for limited relative universal pivoting motion including oscillation between the bogies;
 a pair of hydraulic steering cylinders each having first and second ends;
 a pair of means for connecting the first ends of the steering cylinders to the forward bogie including pivot connections defining pivot centers on opposite sides of and in lateral alignment with the pivot center of the hitch; and
 universal pivot means for connecting together the second ends of the hydraulic cylinders to the rear bogie and defining a single universal pivot center so that the lines of action of the cylinders pass through said center.

11. The articulated combine of claim 10 and further including a stabilizing link pivotally connected between the respective bogies towards their upper portions and disposed generally above the hitch.

* * * * *